US010958589B2

United States Patent
Dinan et al.

(10) Patent No.: US 10,958,589 B2
(45) Date of Patent: Mar. 23, 2021

(54) TECHNOLOGIES FOR OFFLOADED MANAGEMENT OF COMMUNICATION

(71) Applicant: Intel Corporation, Santa Clara, CA (US)

(72) Inventors: James Dinan, Hudson, MA (US); Sayantan Sur, Portland, OR (US); Mario Flajslik, Hudson, MA (US); Keith D. Underwood, Powell, TN (US)

(73) Assignee: Intel Corporation, Santa Clara, CA (US)

( * ) Notice: Subject to any disclaimer, the term of this patent is extended or adjusted under 35 U.S.C. 154(b) by 828 days.

(21) Appl. No.: 15/472,384

(22) Filed: Mar. 29, 2017

(65) Prior Publication Data

US 2018/0287954 A1    Oct. 4, 2018

(51) Int. Cl.
*H04L 12/863* (2013.01)
*H04L 12/801* (2013.01)
*H04L 12/919* (2013.01)

(52) U.S. Cl.
CPC .......... *H04L 47/6265* (2013.01); *H04L 47/18* (2013.01); *H04L 47/765* (2013.01)

(58) Field of Classification Search
None
See application file for complete search history.

(56) References Cited

U.S. PATENT DOCUMENTS

| 6,085,277 | A | * | 7/2000 | Nordstrom | G06F 9/546 710/263 |
| 2004/0076116 | A1 | * | 4/2004 | Hefty | H04L 47/33 370/230 |
| 2004/0267932 | A1 | * | 12/2004 | Voellm | G06F 9/5011 709/226 |
| 2017/0134330 | A1 | * | 5/2017 | Clark | H04L 51/26 |

OTHER PUBLICATIONS

J. Liu and D. K. Panda, "Implementing efficient and scalable flow control schemes in MPI over InfiniBand," 18th International Parallel and Distributed Processing Symposium, 2004. Proceedings., Santa Fe, NM, USA, 2004, p. 183.
Brian Barrett, Ron Brightwell, Keith Underwood, "A Low Impact Flow Control Implementation For Offload Communication Interfaces," Proceedings of the European MPI Users' Group Meeting (2012).
Greg Burns and Raja Daoud, "Robust MPI Message Delivery with Guaranteed Resources," MPI Developers Conference at the University of Notre Dame, 1995.

* cited by examiner

*Primary Examiner* — Clayton R Williams
*Assistant Examiner* — Tania M Pena-Santana
(74) *Attorney, Agent, or Firm* — Compass IP Law, PC

(57) ABSTRACT

Technologies for offloaded management of communication are disclosed. In order to manage communication with information that may be available to applications in a compute device, the compute device may offload communication management to a host fabric interface using a credit management system. A credit limit is established, and each (Continued)

message to be sent is added to a queue with a corresponding number of credits required to send the message. The host fabric interface of the compute device may send out messages as credits become available and decrease the number of available credits based on the number of credits required to send a particular message. When an acknowledgement of receipt of a message is received, the number of credits required to send the corresponding message may be added back to an available credit pool.

25 Claims, 7 Drawing Sheets

TECHNOLOGIES FOR OFFLOADED MANAGEMENT OF COMMUNICATION

GOVERNMENT RIGHTS CLAUSE

This invention was made with Government support under contract number H98230A-13-D-0124 awarded by the Department of Defense. The Government has certain rights in this invention.

BACKGROUND

In high performance computing (HPC), the application layer of the communication stack often has information that can be used to improve overall performance of the communication subsystem. However, managing communication through application software consumes resources that may otherwise be used for computation and incur significant overhead.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
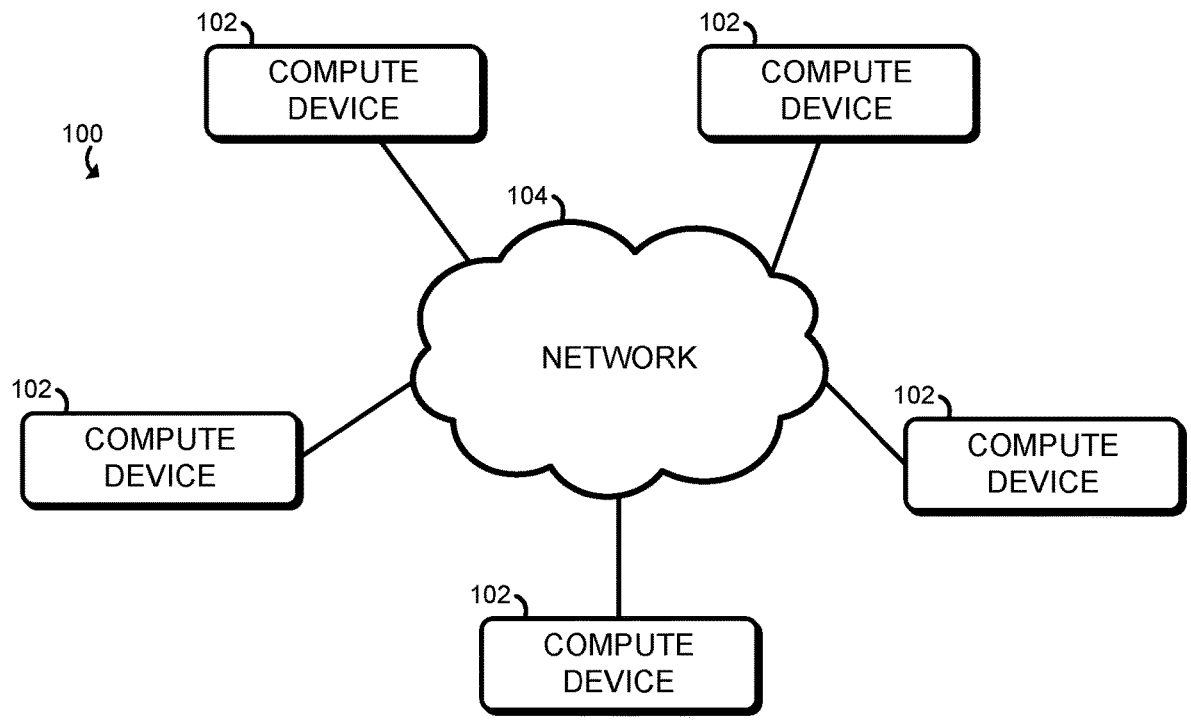
FIG. 1 is a simplified block diagram of at least one embodiment of a network for offloaded management of communication.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 includes several compute devices 102 which are connected by an illustrative network 104. In the illustrative embodiment, one or more applications being executed by one or more of the compute devices 102 may have information that can be used to manage communication over the network 104 between the compute devices 102. In a first example, a data transfer rate supported by the network 104 may be higher than a data storage bandwidth of at least one of the compute devices 102. In a second example, the compute device 102 receiving data sent by another compute device 102 may have a certain fixed amount of buffer space. In a third example, certain messages may need to be sent in a certain order, but the underlying communication system may not ensure that messages are delivered in the same order in which they are sent. For each example, managing the communication to address the situation may be offloaded to the host fabric interface 208 in at least some embodiments. To manage communication, the host fabric interface 208 may employ a credit system. Each message to be sent by the host fabric interface 208 is added to a queue, and messages are sent from the queue in the order in which the messages were added to the queue. Each message requires a certain number of credits, and will not be sent until the credit management system of the host fabric interface 208 indicates that the necessary credit is available. When acknowledgement of receipt of a message is received from the remote compute device 102 to which the message was sent, the credits used by the message are added back to the pool of available credits.

The network 104 may be embodied as any type of network capable of communicatively connecting the compute devices 102. For example, the system 100 may be embodied as a high performance computing (HPC) system or a data center, and the network 104 may be established through a series of cables, switches, and other devices connecting the various compute devices 102 of the HPC system or data center.

Figure 2:
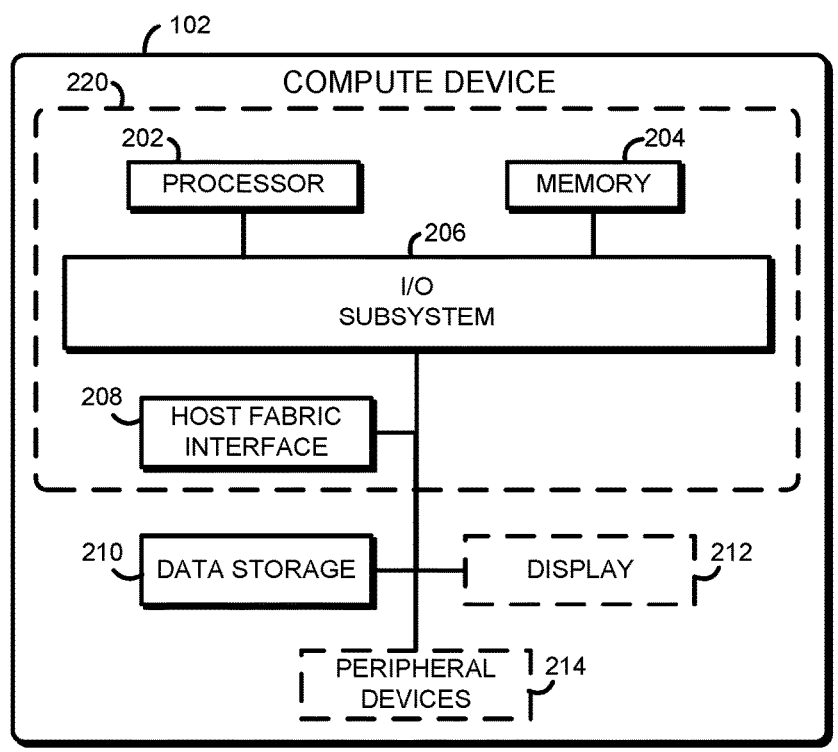
FIG. 2 is a simplified block diagram of at least one embodiment of a compute device of FIG. 1.

Referring now to FIG. 2, an illustrative compute device 102 of the system 100 may be embodied as any type of compute device capable of performing the functions described herein. For example, the compute device 102 may be embodied as or otherwise be included in, without limitation, a server computer, a desktop computer, a smartphone, a cellular phone, a wearable computer, an embedded computing system, a System-on-a-Chip (SoC), a tablet computer, a notebook computer, a laptop computer, a handset, a messaging device, a camera device, a multiprocessor system, a processor-based system, a consumer electronic device, and/or any other computing device.

The illustrative compute device 102 includes a processor 202, the memory 204, an input/output (I/O) subsystem 206, a host fabric interface 208, and data storage 210. In some embodiments, one or more of the illustrative components of the compute device 102 may be incorporated in, or otherwise form a portion of, another component. For example, the memory 204, or portions thereof, may be incorporated in the processor 202 in some embodiments.

The processor 202 may be embodied as any type of processor capable of performing the functions described herein. For example, the processor 202 may be embodied as a single or multi-core processor(s), a single or multi-socket processor, a digital signal processor, a graphics processor, a microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the compute device 102 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the compute device 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the compute device 102 on a single integrated circuit chip. For example, in some embodiments, each of the processor 202, the memory 204, the I/O subsystem 206, and the host fabric interface 208 may be embodied in one package 220 as a system-on-a-chip or a multi-chip package.

The host fabric interface 208 may be embodied as any type of interface capable of interfacing the compute device 102 with the network 104. The host fabric interface 208 may also be referred to or be embodied as a network interface controller (NIC). The host fabric interface 208 may be capable of interfacing with any appropriate cable type, such as an electrical cable or an optical cable. The host fabric interface 208 may be configured to use any one or more communication technology and associated protocols (e.g., Ethernet, Bluetooth®, Wi-Fi®, WiMAX, near field communication (NFC), etc.). The host fabric interface 208 may be capable of directly accessing certain portions of the memory 204 based on instructions from the compute device 102 or based on messages received from other compute devices 102, including reading from and writing to those portions of the memory 204. The host fabric interface 208 may be capable of performing a particular interface, standard, or protocol, such as the Portals 4.0 Network Programming Interface, published by Sandia National Labs in November 2012 with designation SAND2012-10087, the Message Passing Interface Standard Version 3.1 (MPI 3.1), published by the Message Passing Interface Forum on Jun. 4, 2015, the OpenSHMEM 1.3 Application Programming Interface, published by Open Source Solutions, Inc., on Feb. 19, 2016, or similar operations that may employ direct memory access or a partitioned global address space (PGAS). In some embodiments, the host fabric interface 208 may include additional electrical components such as a dedicated processor and memory. Additionally or alternatively, in some embodiments, the host fabric interface 208 may include a pipeline architecture in which at least some of the functions performed by the host fabric interface 208 are performed by dedicated hardware devices or sub-components.

The data storage 210 may be embodied as any type of device or devices configured for the short-term or long-term storage of data. For example, the data storage 210 may include any one or more memory devices and circuits, memory cards, hard disk drives, solid-state drives, or other data storage devices.

Of course, in some embodiments, the compute device 102 may include additional components often found in a compute device 102, such as a display 212 and/or one or more peripheral devices 214. The peripheral devices 214 may include a keyboard, a mouse, etc.

The display 212 may be embodied as any type of display on which information may be displayed to a user of the compute device 102, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 3:
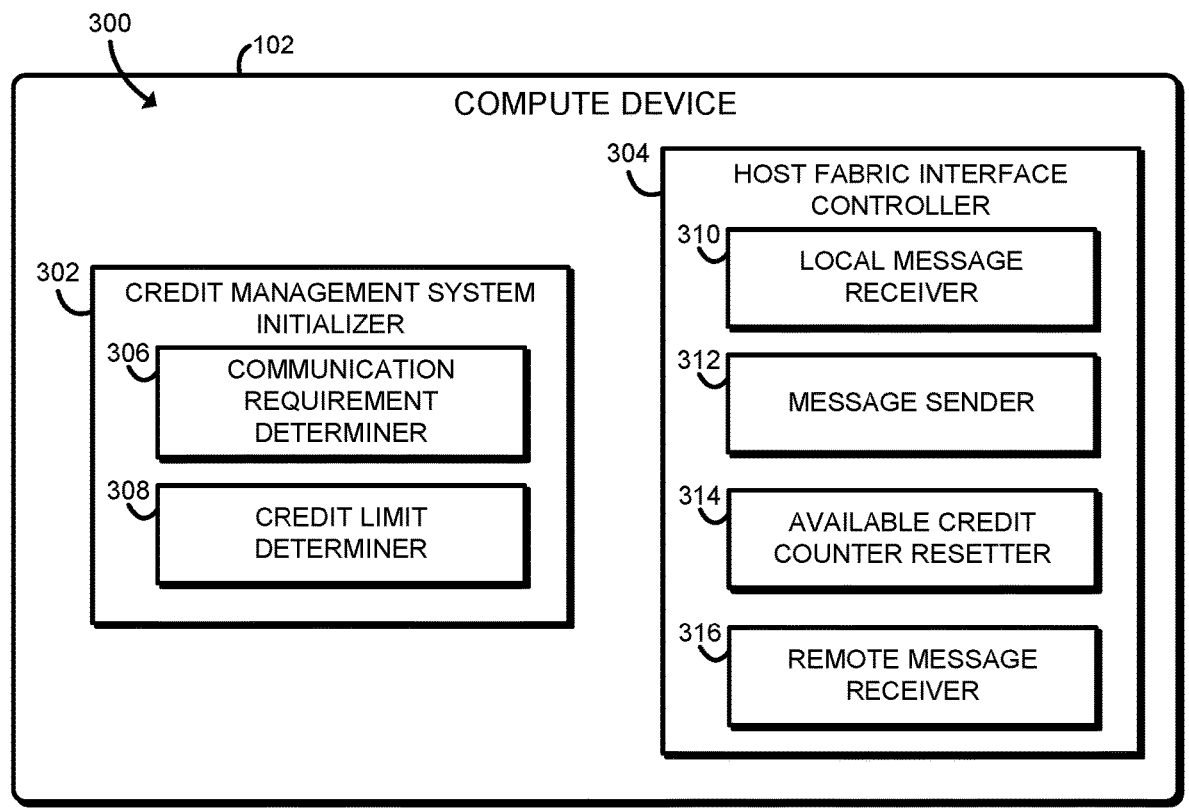
FIG. 3 is a block diagram of at least one embodiment of an environment that may be established by the compute device of FIG. 1.

Referring now to FIG. 3, in use, the compute device 102 may establish an environment 300. The illustrative environment 300 includes a credit management system initializer 302 and a host fabric interface (HFI) controller 304. The various components of the environment 300 may be embodied as hardware, firmware, software, or a combination thereof. As such, in some embodiments, one or more of the components of the environment 300 may be embodied as circuitry or collection of electrical devices (e.g., a credit management system initializer circuit 302, an HFI controller circuit 304, etc.). It should be appreciated that, in such embodiments the credit management system initializer circuit 302, the HFI controller circuit 304, etc. may form a portion of one or more of the processor 202, the I/O subsystem 206, the host fabric interface 208, and/or other components of the compute device 102. Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the processor 202 or other components of the compute device 102.

The credit management system initializer 302 is configured to initialize the credit management system that the host fabric interface 208 uses to manage communications. The credit management system initializer 302 sets up any counters or data structures necessary for the credit management system initializer 302, such as an available credit counter and a pending communication queue in which to store messages to be sent. In the illustrative embodiment, the available credit counter indicates the cumulative number of credits available, including credits that have been returned as available credits by receipt of an acknowledgement of receipt of the corresponding message. Initially, the illustrative available credit counter indicates the credit limit of the credit management system. As messages are added to the queue of messages to be sent, the number of credits required to be in the available credit counter in order for a message being added to the queue is the cumulative number of credits required for all previous messages that have been or will be sent prior to the message being added, including the number of credits required for the message to be added. For example, if the available credit counter starts a value of 2, indicating a credit limit of two, and five messages are added to the queue which each require one credit to be sent, the five messages will be sent when the available credit counter is at least one, two, three, four, and five for the first, second, third, fourth, and fifth message, respectively. In this example, the first two messages would be sent immediately, and the other messages would be sent after the available credit counter increases upon receiving acknowledgements indicating receipt of the messages that have been sent. The cumulative number of credits required for all messages that have been sent, including messages currently in the pending communication queue, may be stored in a queue credit counter. It should be appreciated that, in such embodiments, the messages need not be stored in a queue data structure, since the messages are automatically ordered by the number of credits required to be in the available credit counter in order for the messages to be sent. As a result, in such embodiments, pending communication queue may not be structured as a physical queue data structure, but rather be logically structured as a queue by virtue of the automatic ordering described above. In some embodiments, the available credit counter may indicate the current number of available credits, and may be decreased when credits are used by the sending of a message and may be increased when credits are returned by receiving an acknowledgment of receipt of the message.

It should be appreciated that the pending communication queue may not store the actual messages which are to be sent, but instead may store one or more parameters that can be used to construct a message to be sent. For example, an entry in the pending communication queue may indicate a local memory location that stores message data that is to be sent in the message. Of course, in some embodiments, the pending communication queue may store the actual message data that is to be sent as part of the message.

The credit management system initializer 302 includes a communication requirement determiner 306 and a credit limit determiner 308. The communication requirement determiner 306 may be configured to determine certain communication requirements depending on the particular embodiment of the system 100. For example, in some embodiments, the communication requirement determiner 306 may determine that a data transfer rate supported by the network 104 may be higher than a data storage bandwidth of a remote compute device 102, and that communication that sends a large amount of data to the remote compute device 102 should be limited to a bandwidth that approximately matches the data storage bandwidth of the remote compute device 102. In other embodiments, the remote compute device 102 which is receiving data sent by the compute device 102 may have a certain fixed amount of buffer space. The communication requirement determiner 306 may determine that communication to the remote compute device 102 should be managed such that the remote buffer does not overflow. In still other embodiments, the communication requirement determiner may determine that certain messages may need to be sent in a certain order, but the underlying communication system may not ensure that messages are delivered in the same order in which they are sent. It should be appreciated that the specific requirements determined herein are not limiting, and that other requirements may be determined. It should also be appreciated that, in some embodiments, the requirements may be determined by an operator of the system 100 based on a fixed requirement instead of being determined by the communication requirement determiner 306. For example, a programmer of an application may know that certain messages need to be sent in a certain order, and use the credit management system accordingly.

The credit limit determiner 308 is configured to determine a credit limit based on the requirements determined by the communication requirement determiner 306. For example, when a remote storage write bandwidth is less than the bandwidth of the network 104, the credit limit determiner 308 may establish a credit limit of one or two. Each message may use one credit, so that the remote compute device 102 only has one or two messages to process at a time. The remote compute 102 device may wait to send an acknowledgement until the messages are partially or completely stored, preventing messages being received at a rate higher than they can be stored. When the amount of buffer space in the remote compute device 102 is limited, the credit limit determiner 308 may establish a credit limit available based on the amount of buffer space in the remote compute device 102. For example, the credit limit may be proportional to the amount of buffer space, and the credits required for each message may be proportional to the message length, so that the total amount of data that can be sent at once matches or is less than the amount of buffer space. The remote compute device 102 may wait to send an acknowledgement until the messages in the buffer are processed, ensuring that the buffer does not overflow. When certain messages must be sent in order, the credit limit determiner 308 may establish a credit limit of one credit, and each message that needs to arrive after a previous message may require one credit, so such a message would not be sent until the previous message is acknowledged.

It should be appreciated that, in some embodiments, multiple independent credit management systems may be established by the credit system initializer with independent pending communication queues, available credit counters, etc. The different credit management systems may be established because different types communication may have different requirements. For example, if different remote compute devices 102 have different amounts of buffer space, different credit management systems should be used. Of course, in some embodiments, communication may still be sent from the host fabric interface 208 to remote compute devices 102 without using any credit management system.

The HFI controller 304 is configured to control the host fabric interface 208. The HFI controller 304 processes incoming messages from other compute devices 102 as well as instructions from the local compute device 102 and outgoing messages from the local compute device 102. The HFI controller 304 includes a local message receiver 310, a message sender 312, an available credit counter resetter 314, and a remote message receiver 316.

The local message receiver 310 is configured to receive messages from another component of the local compute device 102 (e.g., from the processor 202). The local message receiver 310 receives one or more parameters about the message to be sent, such as the number of credits required to send the message, and the message data to be sent and/or a local memory location that includes the message data to be sent. In the illustrative embodiments, if there is a limit on a message size, such as a limit based on an amount of buffer space of a remote compute device 102, a long message may be split into multiple messages before the messages are sent to the host fabric interface 208. In some embodiments, the local message receiver 310 may split messages that are longer than a certain threshold length into two or more messages such that each message is at or below the threshold length. The local message receiver 310 is also configured to add an entry to the pending communication queue corresponding to the message to be sent. In the illustrative embodiment, the local message receiver 310 adds entries to the pending communication queue by adding the number of credits required to send the message to the value of the queue credit counter and setting a trigger for the message to be sent when the available credit counter reaches the calculated sum. In other embodiments, the local message receiver 310 may add an entry to the pending communication queue by adding an entry to a queue data structure with an indication of the number of credits required for the message.

The message sender 312 is configured to process messages in the pending communication queue as the required number of credits becomes available. In the illustrative embodiments, the message sender 312 processes messages in the pending communication queue by checking whether any triggers are triggered each time the available credit counter increases. The message sender 312 then sends the corresponding messages that are triggered, which may include reading the memory 204, such as by reading the memory 204 with use of direct memory access. The message sender 312 is also configured to process acknowledgements received from remote compute devices 102 which are sent acknowledging receipt of the messages that have been sent. When an acknowledgement has been received, the message sender 312 increases the available credit counter by the amount of credits required by the corresponding message. The number of credits required by the corresponding message may be included in the acknowledgement, may be stored locally at the local compute device 102, or may be known in some other manner, such as in a credit management system in which every message has the same number of credits.

The available credit counter resetter 314 is configured to reset the available credit counter when necessary. It should be appreciated that, in the illustrative embodiment described, the available credit counter will continually increase, and may, in some embodiments, reach a maximum value such as a maximum number that can be stored in a 32-bit counter. The available credit counter resetter 314 is configured to determine when the available credit counter is close to the maximum value and reset the available credit counter. To do so, in the illustrative embodiment, the available credit counter resetter 314 may stop messages being added to the pending communication queue until all messages in the pending communication queue have been processed (and, in some embodiments, until all acknowledgements have been received). The available credit counter resetter 314 may then reset the available credit counter to the credit limit and reset the queue counter to zero. New messages may now be added to the pending communication queue.

The remote message receiver 316 is configured to receive and process messages sent by a remote compute device 102. The remote message receiver 316 is configured to send an acknowledgement of receipt of the messages to the remote compute device 102, so the remote compute device 102 may add the credits required for sending the message back to its credit pool. In some embodiments, the remote message receiver 316 may send an acknowledgement when a message is first received. In other embodiments, the remote message receiver 316 may send an acknowledgement only when the received message is partially or fully processed, such as stored to the destination storage location or processed from a temporary buffer that may have limited space.

Figure 4:
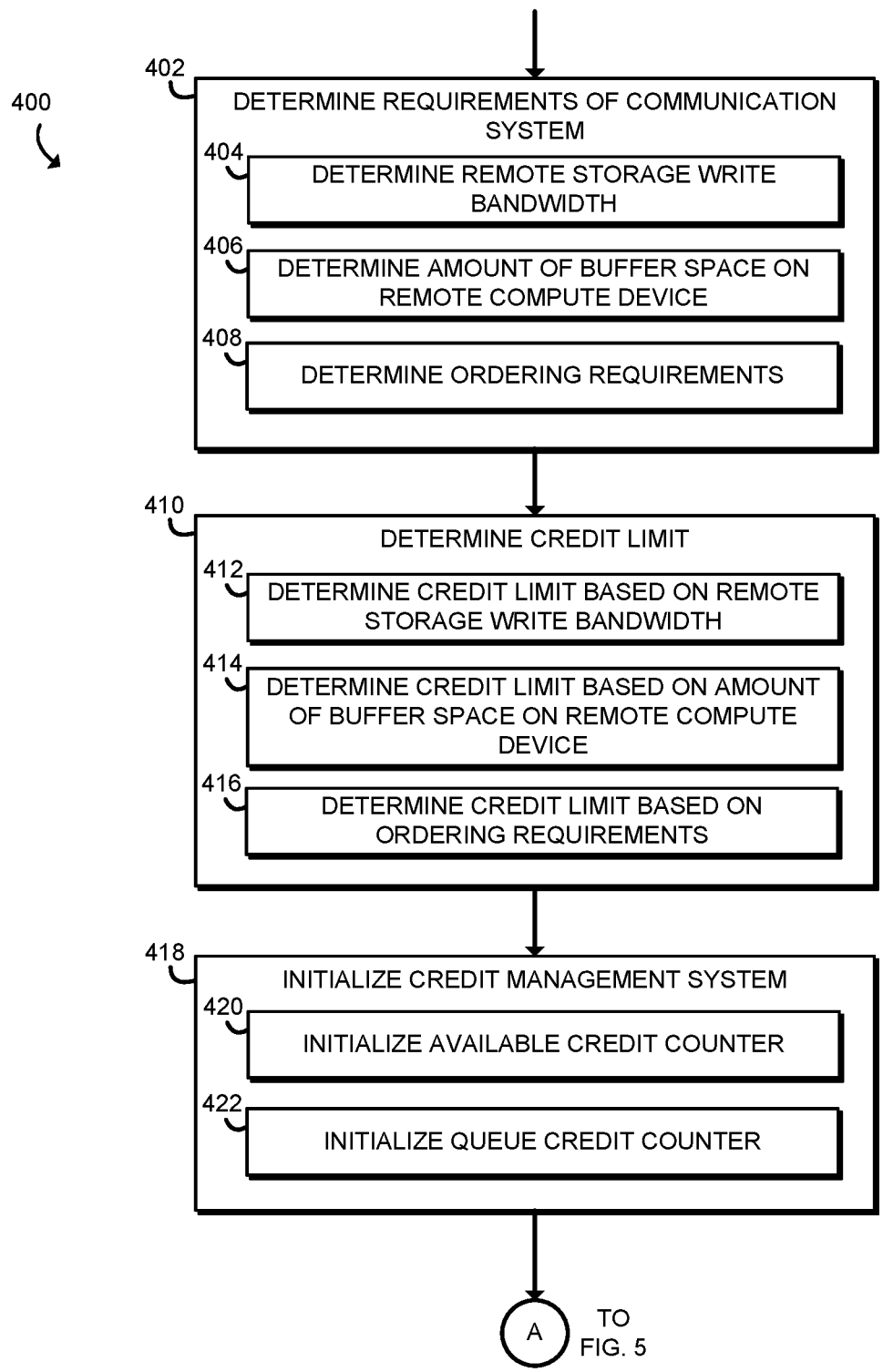
FIGS. 4-6 is a simplified flow diagram of at least one embodiment of a method for offloading management of communication that may be executed by the compute device of FIG. 1.

Referring now to FIG. 4, in use, the compute device 102 may execute a method 400 for offloaded management of communication. The method 400 begins in block 402, in which the compute device 102 determines requirements of the communication system. In block 404, the compute device 102 may determine a remote storage write bandwidth, which may be lower than a data transfer rate supported by the network 104, so that communication that sends a large amount of data to the remote compute device 102 should be limited to a bandwidth that approximately matches the data storage bandwidth of the remote compute device 102. In block 406, the compute device 102 may determine an amount of buffer space on the remote compute device 102, so communication to the remote compute device 102 should be managed such that the remote buffer does not overflow. In block 408, the compute device 102 may determine ordering requirements of messages to be sent by the host fabric interface 208.

In block 410, the compute device 102 determines a credit limit for a credit management system used to manage communication of the compute device 102. In block 412, the compute device 102 may determine a credit limit based on a remote storage write bandwidth. For example, when a remote storage write bandwidth is less than the bandwidth of the network 104, the credit limit determiner 308 may establish a credit limit of one or two. In block 414, the compute device 102 may determine a credit limit based on the amount of buffer space available on the remote compute device 102. For example, the credit limit may be proportional to the amount of buffer space, and the credits required for each message may be proportional to the message length, so that the total amount of data that can be sent at once matches or is less than the amount of buffer space. In block 416, the compute device 102 may determine a credit limit based on ordering requirements of the communication system. For example, the compute device 102 may establish a credit limit of one, and each message that needs to arrive after a previous message may require one credit, so such a message would not be sent until the previous message is acknowledged.

In block 418, the compute device 102 initializes a credit management system. The compute device 102 may initialize any counters or data structures necessary to initialize the credit management system. In block 420, the compute device 102 initializes the available credit counter to the credit limit. As discussed above in more detail, in the illustrative embodiment, the available credit counter indicates the cumulative number of credits available, including credits that have been returned as available credits by receipt of an acknowledgement of receipt of the corresponding message. In other embodiments, the available credit counter may directly indicate the number of credits that are currently available. In the illustrative embodiment, in block 422, the compute device 102 initializes a queue credit counter to zero. In some embodiments, such as embodiments in which the available credit counter indicates the number of credits currently available, a queue credit counter may not be used.

Figure 5:
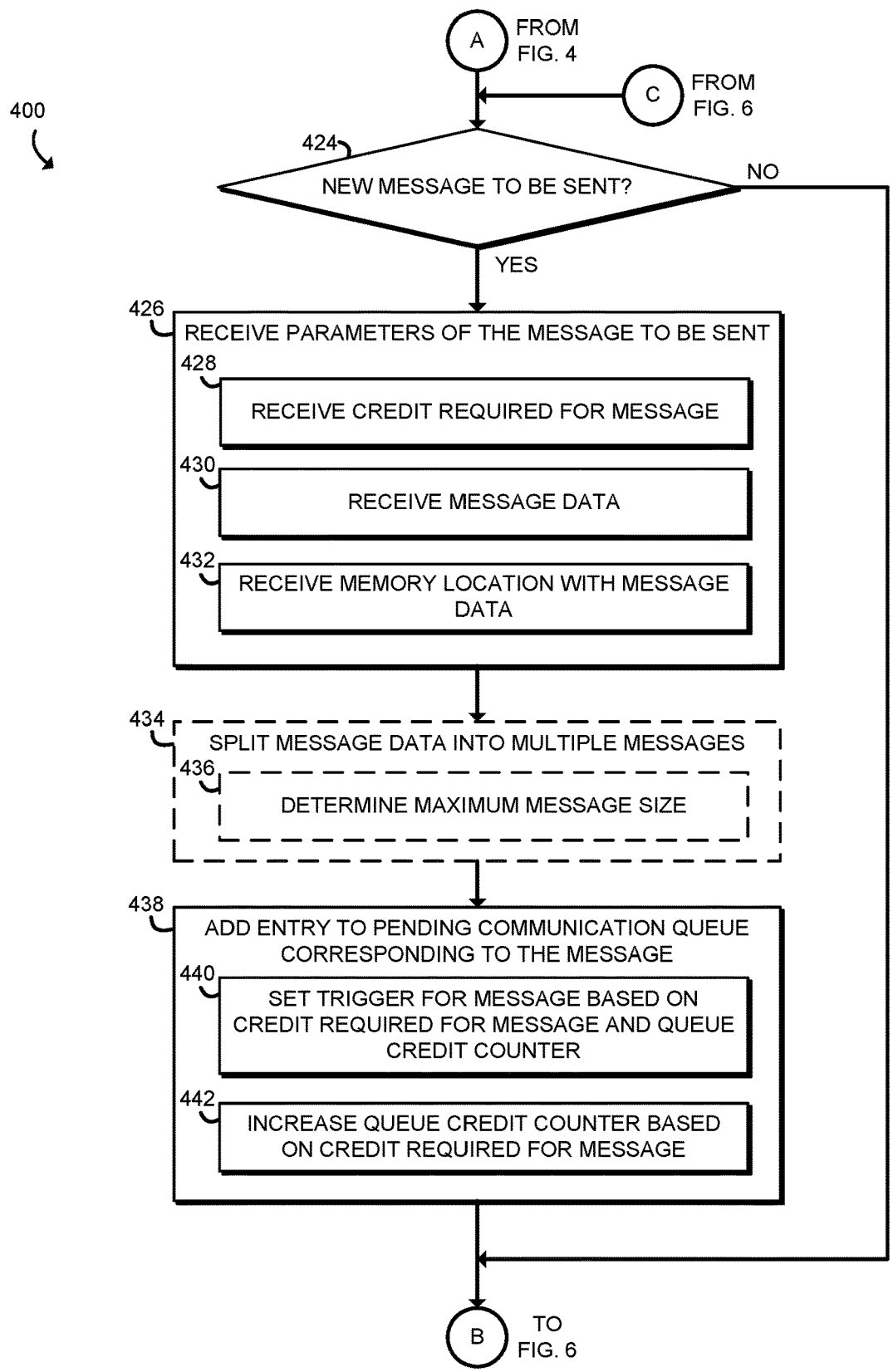

The method 400 continues in block 424, in FIG. 5, in which, if a new message is to be sent, the compute device 102 proceeds to block 426, in which the compute device 102 receives parameters of the message to be sent. In block 428, the host fabric interface 208 receives the credit required for the message to be sent from another component of the compute device 102. In block 430, the host fabric interface receives from another component of the compute device 102 message data to be sent as part of the message. Additionally or alternatively, in block 432, the host fabric interface 208 may receive a memory location that is storing the message data.

In block 434, in some embodiments, the compute device 102 may split the message data into multiple messages. As part of doing so, the compute device 102 may determine a maximum message size in block 436, and split a message into multiple messages based on the message size of the message being greater than the maximum message size.

In block 438, the compute device 102 adds an entry to the pending communication queue corresponding to the message. In the illustrative embodiment, the compute device 102 may set a trigger for the message based on the credit required for sending of the message and the queue credit counter, such as by setting a trigger to send the message when the available credit counter is at least the sum of the number of credits required to send the message and the value of the queue credit counter. In block 442, the compute device 102 increases the value of the queue credit counter based on the number of credits required to send the message, such as by increasing the value of the queue credit counter by the number of credits required to send the message. It should be appreciated that, in some embodiments, the entry may be added to the pending communication queue by adding an entry to a queue data structure, without necessarily setting any triggers or accessing a credit queue counter.

Figure 6:
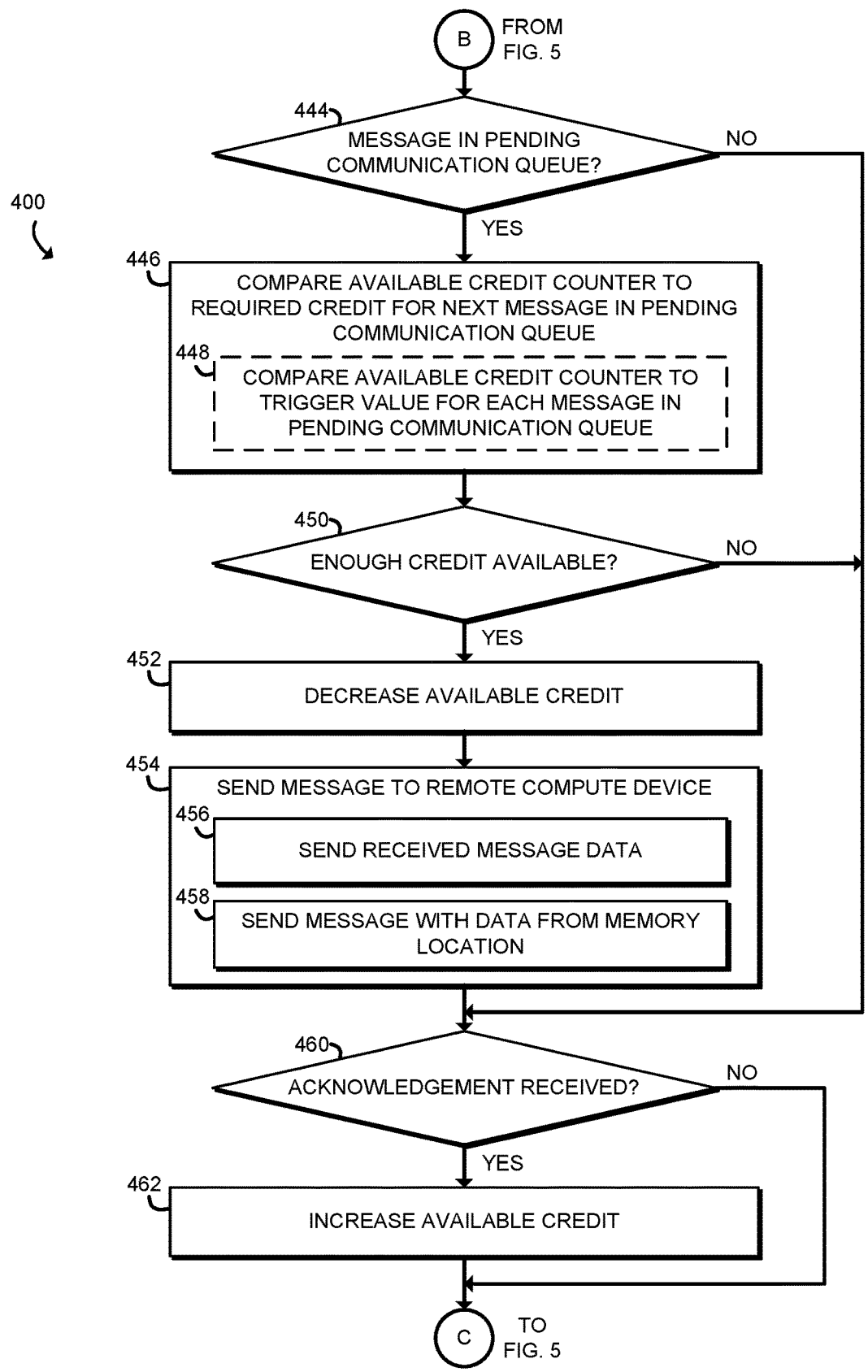

Referring back to block 424, if a new message is not to be sent, the compute device 102 proceeds past block 438, and the method 400 proceeds to block 444 in FIG. 6. In block 444, in FIG. 6, if there is a message in the pending communication queue, the compute device 102 proceeds to block 446, in which the compute device 102 compares the available credit counter to the available credit required to send the next message in the pending communication queue. In the illustrative embodiment, the compute device 102 compares the available credit counter to the available credit required to send the next message by comparing the value of the available credit counter to the trigger value for each message in the pending communication queue. In other embodiments, the compute device 102 may compare the value of the available credit counter to the credit required in the first entry in a queue data structure.

In block 450, if there is enough credit available to send the next message, the method 400 proceeds to block 452, in which compute device 102 decreases the amount of available credit. In the illustrative embodiment, the amount of available credit is automatically decreased, because the credit required for each message to be sent includes the amount of credit required for each previous message. In other embodiments, the amount of available credit may be decreased by decreasing the value of the available credit counter by the number of credits required to send the message.

In block 454, the compute device 102 sends the next message in the pending communication queue to the remote compute device 102. In block 456, the compute device 102 may send the message data that was received back in block 430 in FIG. 5. Additionally or alternatively, in block 458, the compute device 102 may access the memory location that was received back in block 432 in FIG. 5, and send the data stored in that memory location.

Referring back to block 450, if there is not enough credit available, the compute device 102 proceeds to block 460, in which the compute device 102 checks if an acknowledgement has been received. Referring back to block 444, if there is not a message in the pending communication queue, the method 400 also proceeds to block 460.

In block 460, if an acknowledgement has been received, the compute device 102 increases the available credit in block 462 by increasing the value of the available credit counter by the amount of credits needed to send the message corresponding to the acknowledgement. The number of credits required by the corresponding message may be included in the acknowledgement, may be stored locally at the local compute device 102, or may be known in some other manner, such as in a credit management system in which every message has the same number of credits. As discussed above in more detail, in the illustrative embodiment, the available credit counter indicates the cumulative number of credits available, including credits that have been returned as available credits by receipt of an acknowledgement of receipt of the corresponding message, and in other embodiments, the available credit counter directly indicates the number of credits that are currently available. It should be appreciated that, in either case, the available credits are increased by increasing the available credit counter.

Referring back to block 460, if an acknowledgement has not been received, the compute device 102 proceeds past block 462. After block 462, the method 400 loops back to block 424 in FIG. 5, in which the compute device 102 checks if a new message is to be sent.

Figure 7:
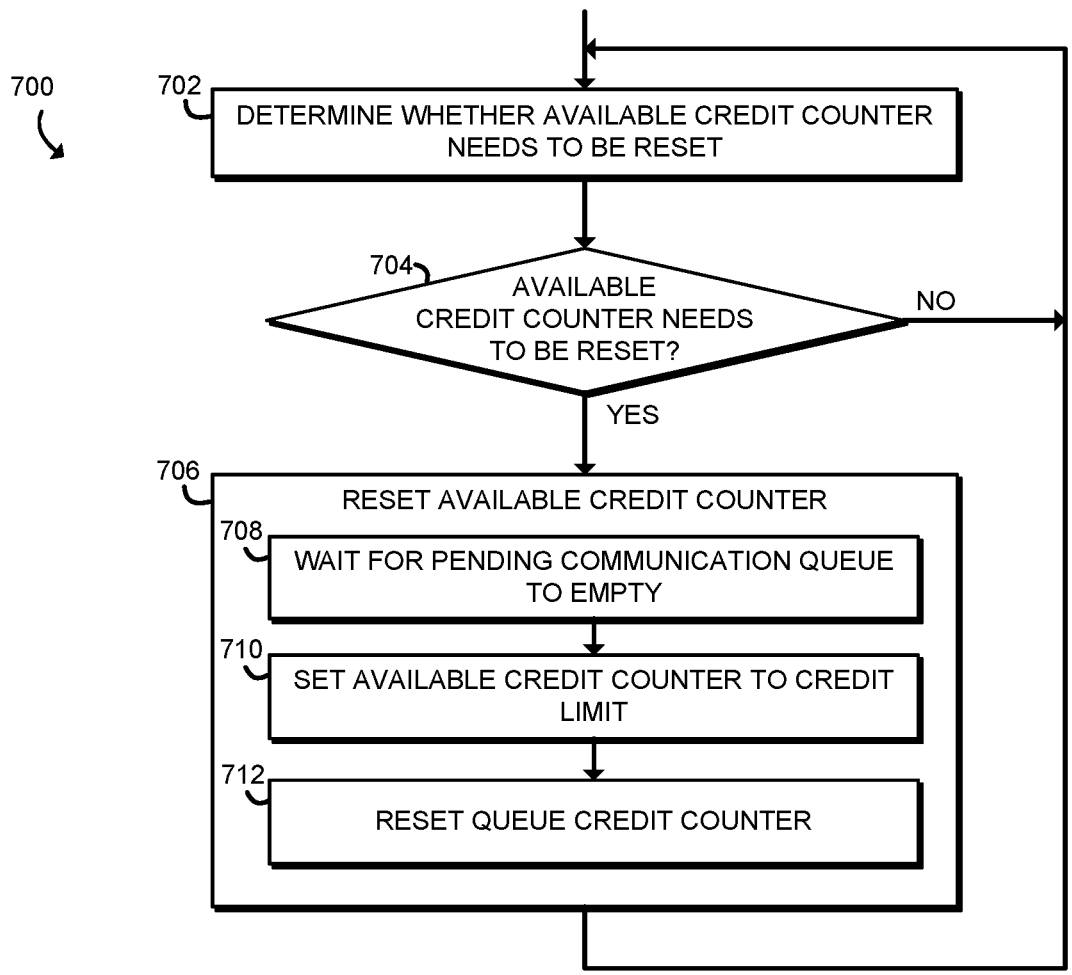
FIG. 7 is a simplified flow diagram of at least one embodiment of a method for resetting an available credit counter that may be executed by the compute device of FIG. 1.

Referring now to FIG. 7, in use, the compute device 102 may execute a method 700 for resetting an available credit counter of a credit management system. It should be appreciated that, in the illustrative embodiment described, the available credit counter will continually increase, and may, in some embodiments, reach a maximum value such as a maximum number that can be stored in a 32-bit counter. The compute device 102 may execute the method 700 is to determine when the available credit counter is close to the maximum value and reset the available credit counter. The method 700 begins in block 702, in which the compute device determines whether the available credit counter needs to be reset. The compute device 102 may determine whether the available credit counter needs to be reset by determining whether the available credit counter is past a threshold value or is at least a certain portion of a maximum value of the available credit counter.

In block 704, if the available credit counter needs to be reset, the compute device 102 proceeds to block 706, in which the compute device 102 resets the available credit counter. To do so, the compute device 102 may wait for the pending communication queue to empty while blocking new messages from being added in block 708, set the available credit counter to the credit limit in block 710, and reset the queue credit counter to zero in block 712. The compute device 102 then loops back to block 702, in which the compute device 102 again checks whether the available credit counter needs to be reset.

Referring back to block 704, if the available credit counter does not need to be reset, the compute device 102 loops back to block 702, in which the compute device 102 determines whether the available credit counter needs to be reset.

Figure 8:
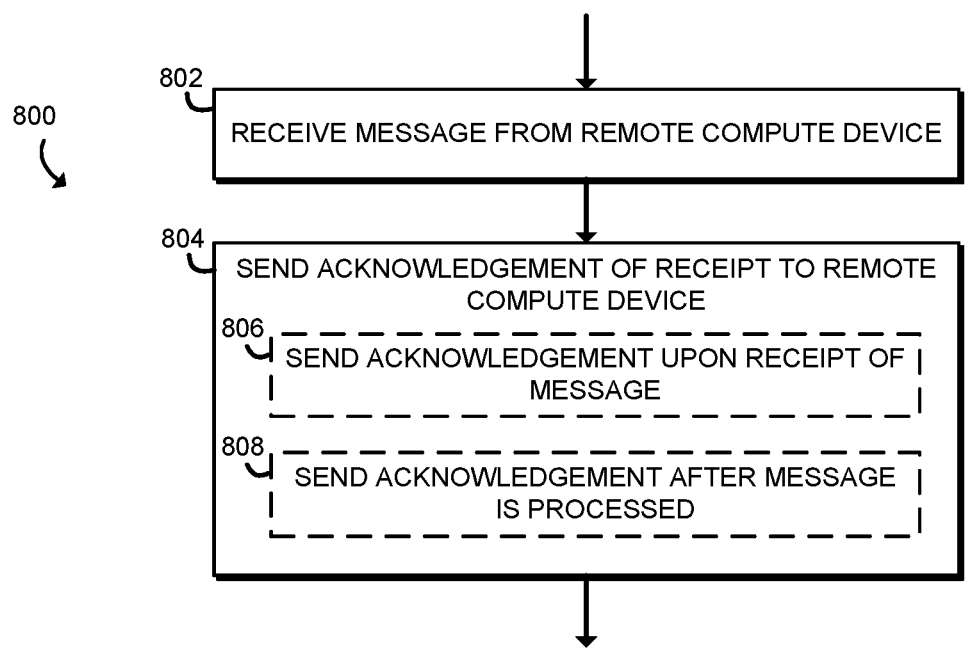
FIG. 8 is a simplified flow diagram of at least one embodiment of a method for acknowledging receipt of a message that may be executed by the compute device of FIG. 1.

Referring now to FIG. 8, in use, the compute device 102 may execute a method 800 for receiving a message from a remote compute device 102. The method 800 begins in block 802, in which the compute device 102 receives a message from a remote compute device.

In block 804, the compute device 102 sends an acknowledgement to the remote compute device 102. In some embodiments, the compute device 102 may send an acknowledgement upon receipt of the message in block 806. In other embodiments, the compute device 102 may send an acknowledgement after the message is processed in block 808.

EXAMPLES

Illustrative examples of the devices, systems, and methods disclosed herein are provided below. An embodiment of the devices, systems, and methods may include any one or more, and any combination of, the examples described below.

Example 1 includes a compute device for offloaded management of communication by a host fabric interface of the compute device, the compute device comprising a processor; a memory having stored thereon a plurality of instructions that, when executed, cause the compute device to initialize a credit management system on the host fabric interface, wherein to initialize the credit management system comprises to initialize a pending communication queue and store an indication of a credit limit; receive, by the host fabric interface and from the compute device, one or more parameters of a message to be sent by the host fabric interface, wherein the one or more parameters of the message comprises a number of credits required to send the message and wherein the host fabric interface is different from the processor of the compute device; add an entry to the pending communication queue in response to receipt of the one or more parameters of the message; determine, by the host fabric interface, a number of currently available credits of the credit management system; determine, by the host fabric interface, whether the number of currently available credits is at least the number of credits required to send the message; send, by the host fabric interface and in response to a determination that the number of available credits is at least the number of credits required to send the message, the message to a remote compute device.

Example 2 includes the subject matter of Example 1, and wherein to initialize the credit management system comprises to initialize a value of an available credit counter to the credit limit, wherein the value of the available credit counter indicates a cumulative number of credits available; and initialize a value of a queue credit counter to zero, wherein the value of the queue credit counter indicates a cumulative number of credits used by the pending communication queue.

Example 3 includes the subject matter of any of Examples 1 and 2, and wherein to add the entry to the pending communication queue comprises to determine a trigger value based on the number of credits required to send the message and the present value of the queue credit counter; add a trigger to send the message when the value of the available credit counter is at least the trigger value; and increase the value of the queue credit counter by the number of credits required to send the message.

Example 4 includes the subject matter of any of Examples 1-3, and wherein to determine whether the number of available credits is at least the number of credits required to send the message comprises to determine whether the value of the available credit counter is at least the trigger value.

Example 5 includes the subject matter of any of Examples 1-4, and wherein the plurality of instructions further causes the compute device to receive, by the host fabric interface, an acknowledgement of receipt of the message by the remote compute device; and increase, by the host fabric interface, the value of the available credit counter by the number of credits required to send the message.

Example 6 includes the subject matter of any of Examples 1-5, and wherein the plurality of instructions further causes the compute device to determine that the value of the available credit counter is at least a reset threshold value; wait for the pending communication queue to empty; set the value of the available credit counter to the credit limit; and set the value of the queue credit counter to zero.

Example 7 includes the subject matter of any of Examples 1-6, and wherein to store an indication of the credit limit comprises to initialize a value of an available credit counter to the credit limit, wherein to determine, by the host fabric interface, a number of currently available credits of the credit management system comprises to determine, by the host fabric interface, the current value of the available credit counter, and wherein to determine, by the host fabric interface, whether the number of currently available credits is at least the number of credits required to send the message comprises to determine, by the host fabric interface, whether the value of the available credit counter is at least the number of credits required to send the message.

Example 8 includes the subject matter of any of Examples 1-7, and wherein the plurality of instructions further causes the compute device to decrease, by the host fabric interface and in response to the message being sent, the value of the available credit counter by the number of credits required to send the message.

Example 9 includes the subject matter of any of Examples 1-8, and wherein the plurality of instructions further causes the compute device to receive, by the host fabric interface, an acknowledgement of receipt of the message by the remote compute device; and increase, by the host fabric interface, the value of the available credit counter by the number of credits required to send the message.

Example 10 includes the subject matter of any of Examples 1-9, and wherein to determine whether the number of currently available credits is at least the number of credits required to send the message comprises to determine whether the number of currently available credits is at least the number of credits required to send the message when the entry of the pending communication queue associated with the message is at the head of the pending communication queue.

Example 11 includes the subject matter of any of Examples 1-10, and wherein the one or more parameters comprises message data, and wherein to send the message to the remote compute device comprises to send the message data to the remote compute device.

Example 12 includes the subject matter of any of Examples 1-11, and wherein the one or more parameters comprises a local memory location, and wherein to send the message to the remote compute device comprises to retrieve, by the host fabric interface and with use of direct memory access, message data from the local memory location; send, by the host fabric interface, the message data to the remote compute device.

Example 13 includes the subject matter of any of Examples 1-12, and wherein the one or more parameters comprises a remote memory location, and wherein to send the message to the remote compute device comprises to send a request to the remote compute device for data stored in the remote memory location.

Example 14 includes the subject matter of any of Examples 1-13, and wherein the plurality of instructions further causes the compute device to determine the credit limit based on a storage write bandwidth of the remote compute device and a communication bandwidth between the compute device and the remote compute device.

Example 15 includes the subject matter of any of Examples 1-14, and wherein the plurality of instructions further causes the compute device to determine the credit limit based on an amount of buffer space of the remote compute device.

Example 16 includes the subject matter of any of Examples 1-15, and wherein the plurality of instructions further causes the compute device to determine the credit limit based on an ordering requirement of one or more messages to be sent.

Example 17 includes the subject matter of any of Examples 1-16, and wherein the host fabric interface is in its own package separate from the processor.

Example 18 includes the subject matter of any of Examples 1-17, and wherein the host fabric interface is in a multi-chip package with the processor or is in a system-on-a-chip with the processor.

Example 19 includes the subject matter of any of Examples 1-18, and further including data storage and a display.

Example 20 includes a method for offloaded management of communication by a host fabric interface of a compute device, the method comprising initializing, by the compute device, a credit management system on the host fabric interface, wherein initializing the credit management system comprises initializing a pending communication queue and storing an indication of a credit limit; receiving, by the host fabric interface and from the compute device, one or more parameters of a message to be sent by the host fabric interface, wherein the one or more parameters of the message comprises a number of credits required to send the message and wherein the host fabric interface is different from a processor of the compute device; adding an entry to the pending communication queue in response to receipt of the one or more parameters of the message; determining, by the host fabric interface, a number of currently available credits of the credit management system; determining, by the host fabric interface, whether the number of currently available credits is at least the number of credits required to send the message; sending, by the host fabric interface and in response to a determination that the number of available credits is at least the number of credits required to send the message, the message to a remote compute device.

Example 21 includes the subject matter of Example 20, and wherein initializing the credit management system comprises initializing a value of an available credit counter to the credit limit, wherein the value of the available credit counter indicates a cumulative number of credits available; and initializing a value of a queue credit counter to zero, wherein the value of the queue credit counter indicates a cumulative number of credits used by the pending communication queue.

Example 22 includes the subject matter of any of Examples 20 and 21, and wherein adding the entry to the pending communication queue comprises determining a trigger value based on the number of credits required to send the message and the present value of the queue credit counter; adding a trigger to send the message when the value of the available credit counter is at least the trigger value; and increasing the value of the queue credit counter by the number of credits required to send the message.

Example 23 includes the subject matter of any of Examples 20-22, and wherein determining whether the number of available credits is at least the number of credits required to send the message comprises determining whether the value of the available credit counter is at least the trigger value.

Example 24 includes the subject matter of any of Examples 20-23, and further including receiving, by the host fabric interface, an acknowledgement of receipt of the message by the remote compute device; and increasing, by the host fabric interface, the value of the available credit counter by the number of credits required to send the message.

Example 25 includes the subject matter of any of Examples 20-24, and further including determining, by the compute device, that the value of the available credit counter is at least a reset threshold value; waiting, by the compute device, for the pending communication queue to empty; setting, by the compute device, the value of the available credit counter to the credit limit; and setting, by the compute device, the value of the queue credit counter to zero.

Example 26 includes the subject matter of any of Examples 20-25, and wherein storing an indication of the credit limit comprises initializing a value of an available credit counter to the credit limit, wherein determining, by the host fabric interface, a number of currently available credits of the credit management system comprises determining, by the host fabric interface, the current value of the available credit counter, and wherein determining, by the host fabric interface, whether the number of currently available credits is at least the number of credits required to send the message comprises determining, by the host fabric interface, whether the value of the available credit counter is at least the number of credits required to send the message.

Example 27 includes the subject matter of any of Examples 20-26, and further including decreasing, by the host fabric interface and in response to sending the message, the value of the available credit counter by the number of credits required to send the message.

Example 28 includes the subject matter of any of Examples 20-27, and further including receiving, by the host fabric interface, an acknowledgement of receipt of the message by the remote compute device; and increasing, by the host fabric interface, the value of the available credit counter by the number of credits required to send the message.

Example 29 includes the subject matter of any of Examples 20-28, and wherein determining whether the number of currently available credits is at least the number of credits required to send the message comprises determining whether the number of currently available credits is at least the number of credits required to send the message when the entry of the pending communication queue associated with the message is at the head of the pending communication queue.

Example 30 includes the subject matter of any of Examples 20-29, and wherein the one or more parameters comprises message data, and wherein sending the message to the remote compute device comprises sending the message data to the remote compute device.

Example 31 includes the subject matter of any of Examples 20-30, and wherein the one or more parameters comprises a local memory location, and wherein sending the message to the remote compute device comprises retrieving, by the host fabric interface and with use of direct memory access, message data from the local memory location; sending, by the host fabric interface, the message data to the remote compute device.

Example 32 includes the subject matter of any of Examples 20-31, and wherein the one or more parameters comprises a remote memory location, and wherein sending the message to the remote compute device comprises sending a request to the remote compute device for data stored in the remote memory location.

Example 33 includes the subject matter of any of Examples 20-32, and further including determining the credit limit based on a storage write bandwidth of the remote compute device and a communication bandwidth between the compute device and the remote compute device.

Example 34 includes the subject matter of any of Examples 20-33, and further including determining the credit limit based on an amount of buffer space of the remote compute device.

Example 35 includes the subject matter of any of Examples 20-34, and further including determining the credit limit based on an ordering requirement of one or more messages to be sent.

Example 36 includes the subject matter of any of Examples 20-35, and wherein the host fabric interface is in its own package separate from the processor.

Example 37 includes the subject matter of any of Examples 20-36, and wherein the host fabric interface is in a multi-chip package with the processor or is in a system-on-a-chip with the processor.

Example 38 includes one or more computer-readable media comprising a plurality of instructions stored thereon that, when executed, causes a compute device to perform the method of any of Examples 20-37.

Example 39 includes a compute device comprising means to perform the method of any of Examples 20-37.

Example 40 includes a compute device for offloaded management of communication by a host fabric interface of the compute device, the compute device comprising means for initializing a credit management system on the host fabric interface, wherein the means for initializing the credit management system comprises means for initializing a pending communication queue and means for storing an indication of a credit limit; means for receiving, by the host fabric interface and from the compute device, one or more parameters of a message to be sent by the host fabric interface, wherein the one or more parameters of the message comprises a number of credits required to send the message and wherein the host fabric interface is different from a processor of the compute device; means for adding an entry to the pending communication queue in response to receipt of the one or more parameters of the message; means for determining, by the host fabric interface, a number of currently available credits of the credit management system; and means for determining, by the host fabric interface, whether the number of currently available credits is at least the number of credits required to send the message, wherein the host fabric interface is to send, in response to a determination that the number of available credits is at least the number of credits required to send the message, the message to a remote compute device.

Example 41 includes the subject matter of Example 40, and wherein the means for initializing the credit management system comprises means for initializing a value of an available credit counter to the credit limit, wherein the value of the available credit counter indicates a cumulative number of credits available; and means for initializing a value of a queue credit counter to zero, wherein the value of the queue credit counter indicates a cumulative number of credits used by the pending communication queue.

Example 42 includes the subject matter of any of Examples 40 and 41, and wherein the means for adding the entry to the pending communication queue comprises means for determining a trigger value based on the number of credits required to send the message and the present value of the queue credit counter; means for adding a trigger to send the message when the value of the available credit counter is at least the trigger value; and means for increasing the value of the queue credit counter by the number of credits required to send the message.

Example 43 includes the subject matter of any of Examples 40-42, and wherein the means for determining whether the number of available credits is at least the number of credits required to send the message comprises means for determining whether the value of the available credit counter is at least the trigger value.

Example 44 includes the subject matter of any of Examples 40-43, and further including means for receiving, by the host fabric interface, an acknowledgement of receipt of the message by the remote compute device; and means for increasing, by the host fabric interface, the value of the available credit counter by the number of credits required to send the message.

Example 45 includes the subject matter of any of Examples 40-44, and further including means for determining that the value of the available credit counter is at least a reset threshold value; means for waiting for the pending communication queue to empty; means for setting the value of the available credit counter to the credit limit; and means for setting the value of the queue credit counter to zero.

Example 46 includes the subject matter of any of Examples 40-45, and wherein the means for storing an indication of the credit limit comprises means for initializing a value of an available credit counter to the credit limit, wherein the means for determining, by the host fabric interface, a number of currently available credits of the credit management system comprises means for determining, by the host fabric interface, the current value of the available credit counter, and wherein the means for determining, by the host fabric interface, whether the number of currently available credits is at least the number of credits required to send the message comprises means for determining, by the host fabric interface, whether the value of the available credit counter is at least the number of credits required to send the message.

Example 47 includes the subject matter of any of Examples 40-46, and further including means for decreasing, by the host fabric interface and in response to sending the message, the value of the available credit counter by the number of credits required to send the message.

Example 48 includes the subject matter of any of Examples 40-47, and further including means for receiving, by the host fabric interface, an acknowledgement of receipt of the message by the remote compute device; and means for increasing, by the host fabric interface, the value of the available credit counter by the number of credits required to send the message.

Example 49 includes the subject matter of any of Examples 40-48, and wherein the means for determining whether the number of currently available credits is at least the number of credits required to send the message comprises means for determining whether the number of currently available credits is at least the number of credits required to send the message when the entry of the pending communication queue associated with the message is at the head of the pending communication queue.

Example 50 includes the subject matter of any of Examples 40-49, and wherein the one or more parameters comprises message data, and wherein to send the message to the remote compute device comprises to send the message data to the remote compute device.

Example 51 includes the subject matter of any of Examples 40-50, and wherein the one or more parameters comprises a local memory location, and wherein to send the message to the remote compute device comprises to retrieve, by the host fabric interface and with use of direct memory access, message data from the local memory location; send, by the host fabric interface, the message data to the remote compute device.

Example 52 includes the subject matter of any of Examples 40-51, and wherein the one or more parameters comprises a remote memory location, and wherein to send the message to the remote compute device comprises to send a request to the remote compute device for data stored in the remote memory location.

Example 53 includes the subject matter of any of Examples 40-52, and further including means for determining the credit limit based on a storage write bandwidth of the remote compute device and a communication bandwidth between the compute device and the remote compute device.

Example 54 includes the subject matter of any of Examples 40-53, and further including means for determining the credit limit based on an amount of buffer space of the remote compute device.

Example 55 includes the subject matter of any of Examples 40-54, and further including means for determining the credit limit based on an ordering requirement of one or more messages to be sent.

Example 56 includes the subject matter of any of Examples 40-55, and wherein the host fabric interface is in its own package separate from the processor.

Example 57 includes the subject matter of any of Examples 40-56, and wherein the host fabric interface is in a multi-chip package with the processor or is in a system-on-a-chip with the processor.

Example 58 includes a compute device for offloaded management of communication by a host fabric interface of the compute device, the compute device comprising a communication system initializer to initialize a credit management system on the host fabric interface, wherein to initialize the credit management system comprises to initialize a pending communication queue and store an indication of a credit limit; and a host fabric interface to receive, from the compute device, one or more parameters of a message to be sent by the host fabric interface, wherein the one or more parameters of the message comprises a number of credits required to send the message and wherein the host fabric interface is different from a processor of the compute device; add an entry to the pending communication queue in response to receipt of the one or more parameters of the message; determine a number of currently available credits of the credit management system; determine whether the number of currently available credits is at least the number of credits required to send the message; send, in response to a determination that the number of available credits is at least the number of credits required to send the message, the message to a remote compute device.

Example 59 includes the subject matter of Example 58, and wherein to initialize the credit management system comprises to initialize a value of an available credit counter to the credit limit, wherein the value of the available credit counter indicates a cumulative number of credits available; and initialize a value of a queue credit counter to zero, wherein the value of the queue credit counter indicates a cumulative number of credits used by the pending communication queue.

Example 60 includes the subject matter of any of Examples 58 and 59, and wherein to add the entry to the pending communication queue comprises to determine a trigger value based on the number of credits required to send the message and the present value of the queue credit counter; add a trigger to send the message when the value of the available credit counter is at least the trigger value; and increase the value of the queue credit counter by the number of credits required to send the message.

Example 61 includes the subject matter of any of Examples 58-60, and wherein to determine whether the number of available credits is at least the number of credits required to send the message comprises to determine whether the value of the available credit counter is at least the trigger value.

Example 62 includes the subject matter of any of Examples 58-61, and wherein the host fabric interface is further to receive an acknowledgement of receipt of the message by the remote compute device; and increase the value of the available credit counter by the number of credits required to send the message.

Example 63 includes the subject matter of any of Examples 58-62, and wherein the host fabric interface is further to determine that the value of the available credit counter is at least a reset threshold value; wait for the pending communication queue to empty; set the value of the available credit counter to the credit limit; and set the value of the queue credit counter to zero.

Example 64 includes the subject matter of any of Examples 58-63, and wherein to store an indication of the credit limit comprises to initialize a value of an available credit counter to the credit limit, wherein to determine a number of currently available credits of the credit management system comprises to determine the current value of the available credit counter, and wherein to determine whether the number of currently available credits is at least the number of credits required to send the message comprises to determine whether the value of the available credit counter is at least the number of credits required to send the message.

Example 65 includes the subject matter of any of Examples 58-64, and wherein the host fabric interface is further to decrease, in response to the message being sent, the value of the available credit counter by the number of credits required to send the message.

Example 66 includes the subject matter of any of Examples 58-65, and wherein the host fabric interface is further to receive an acknowledgement of receipt of the message by the remote compute device; and increase the value of the available credit counter by the number of credits required to send the message.

Example 67 includes the subject matter of any of Examples 58-66, and wherein to determine whether the number of currently available credits is at least the number of credits required to send the message comprises to determine whether the number of currently available credits is at least the number of credits required to send the message when the entry of the pending communication queue associated with the message is at the head of the pending communication queue.

Example 68 includes the subject matter of any of Examples 58-67, and wherein the one or more parameters comprises message data, and wherein to send the message to the remote compute device comprises to send the message data to the remote compute device.

Example 69 includes the subject matter of any of Examples 58-68, and wherein the one or more parameters comprises a local memory location, and wherein to send the message to the remote compute device comprises to retrieve, with use of direct memory access, message data from the local memory location; send the message data to the remote compute device.

Example 70 includes the subject matter of any of Examples 58-69, and wherein the one or more parameters comprises a remote memory location, and wherein to send the message to the remote compute device comprises to send a request to the remote compute device for data stored in the remote memory location.

Example 71 includes the subject matter of any of Examples 58-70, and wherein the host fabric interface is further to determine the credit limit based on a storage write bandwidth of the remote compute device and a communication bandwidth between the compute device and the remote compute device.

Example 72 includes the subject matter of any of Examples 58-71, and wherein the host fabric interface is further to determine the credit limit based on an amount of buffer space of the remote compute device.

Example 73 includes the subject matter of any of Examples 58-72, and wherein the host fabric interface is further to determine the credit limit based on an ordering requirement of one or more messages to be sent.

Example 74 includes the subject matter of any of Examples 58-73, and wherein the host fabric interface is in its own package separate from the processor.

Example 75 includes the subject matter of any of Examples 58-74, and wherein the host fabric interface is in a multi-chip package with the processor or is in a system-on-a-chip with the processor.

Example 76 includes the subject matter of any of Examples 58-75, and further including data storage and a display.

The invention claimed is:

1. A compute device for offloaded management of communication by a host fabric interface of the compute device, the compute device comprising:
   a processor;
   a memory having stored thereon a plurality of instructions that, when executed, cause the compute device to:
      determine a credit limit for a credit management system based on a storage write bandwidth of a remote compute device;
      initialize the credit management system on the host fabric interface, wherein to initialize the credit management system comprises to initialize a pending communication queue and store an indication of the credit limit;
      receive, by the host fabric interface and from the compute device, one or more parameters of a message to be sent by the host fabric interface, wherein the one or more parameters of the message comprises a number of credits required to send the message and wherein the host fabric interface is different from the processor of the compute device;
      add an entry to the pending communication queue in response to receipt of the one or more parameters of the message;
      determine, by the host fabric interface, a number of currently available credits of the credit management system;
      determine, by the host fabric interface, whether the number of currently available credits is at least the number of credits required to send the message; and
      send, by the host fabric interface and in response to a determination that the number of currently available credits is at least the number of credits required to send the message, the message to the remote compute device.

2. The compute device of claim 1, wherein to initialize the credit management system comprises to:
   initialize a value of an available credit counter to the credit limit, wherein the value of the available credit counter indicates a cumulative number of credits available; and
   initialize a value of a queue credit counter to zero, wherein the value of the queue credit counter indicates a cumulative number of credits used by the pending communication queue.

3. The compute device of claim 2, wherein to add the entry to the pending communication queue comprises to:
   determine a trigger value based on the number of credits required to send the message and a present value of the queue credit counter;
   add a trigger to send the message when the value of the available credit counter is at least the trigger value; and
   increase the value of the queue credit counter by the number of credits required to send the message.

4. The compute device of claim 3, wherein to determine whether the number of currently available credits is at least the number of credits required to send the message comprises to determine whether the value of the available credit counter is at least the trigger value.

5. The compute device of claim 4, wherein the plurality of instructions further causes the compute device to:
   receive, by the host fabric interface, an acknowledgement of receipt of the message by the remote compute device; and
   increase, by the host fabric interface, the value of the available credit counter by the number of credits required to send the message.

6. The compute device of claim 1, wherein to store an indication of the credit limit comprises to initialize a value of an available credit counter to the credit limit,
   wherein to determine, by the host fabric interface, a number of currently available credits of the credit management system comprises to determine, by the host fabric interface, a current value of the available credit counter, and
   wherein to determine, by the host fabric interface, whether the number of currently available credits is at least the number of credits required to send the message comprises to determine, by the host fabric interface, whether the value of the available credit counter is at least the number of credits required to send the message.

7. The compute device of claim 1, wherein to determine whether the number of currently available credits is at least the number of credits required to send the message comprises to determine whether the number of currently available credits is at least the number of credits required to send the message when the entry of the pending communication queue associated with the message is at a head of the pending communication queue.

8. The compute device of claim 1, wherein the host fabric interface is in its own package separate from the processor.

9. A method for offloaded management of communication by a host fabric interface of a compute device, the method comprising:
  determining, by the compute device, a credit limit for a credit management system based on a storage write bandwidth of a remote compute device;
  initializing, by the compute device, the credit management system on the host fabric interface, wherein initializing the credit management system comprises initializing a pending communication queue and storing an indication of the credit limit;
  receiving, by the host fabric interface and from the compute device, one or more parameters of a message to be sent by the host fabric interface, wherein the one or more parameters of the message comprises a number of credits required to send the message and wherein the host fabric interface is different from a processor of the compute device;
  adding an entry to the pending communication queue in response to receipt of the one or more parameters of the message;
  determining, by the host fabric interface, a number of currently available credits of the credit management system;
  determining, by the host fabric interface, whether the number of currently available credits is at least the number of credits required to send the message; and
  sending, by the host fabric interface and in response to a determination that the number of currently available credits is at least the number of credits required to send the message, the message to the remote compute device.

10. The method of claim 9, wherein initializing the credit management system comprises:
  initializing a value of an available credit counter to the credit limit, wherein the value of the available credit counter indicates a cumulative number of credits available; and
  initializing a value of a queue credit counter to zero, wherein the value of the queue credit counter indicates a cumulative number of credits used by the pending communication queue.

11. The method of claim 10, wherein adding the entry to the pending communication queue comprises:
  determining a trigger value based on the number of credits required to send the message and a present value of the queue credit counter;
  adding a trigger to send the message when the value of the available credit counter is at least the trigger value; and
  increasing the value of the queue credit counter by the number of credits required to send the message.

12. The method of claim 11, wherein determining whether the number of currently available credits is at least the number of credits required to send the message comprises determining whether the value of the available credit counter is at least the trigger value.

13. The method of claim 12, further comprising:
  receiving, by the host fabric interface, an acknowledgement of receipt of the message by the remote compute device; and
  increasing, by the host fabric interface, the value of the available credit counter by the number of credits required to send the message.

14. The method of claim 9, wherein storing an indication of the credit limit comprises initializing a value of an available credit counter to the credit limit,
  wherein determining, by the host fabric interface, a number of currently available credits of the credit management system comprises determining, by the host fabric interface, a current value of the available credit counter, and
  wherein determining, by the host fabric interface, whether the number of currently available credits is at least the number of credits required to send the message comprises determining, by the host fabric interface, whether the value of the available credit counter is at least the number of credits required to send the message.

15. One or more non-transitory computer-readable media comprising a plurality of instructions stored thereon that, when executed, causes a compute device to:
  determine a credit limit for a credit management system based on a storage write bandwidth of a remote compute device;
  initialize the credit management system on a host fabric interface, wherein to initialize the credit management system comprises to initialize a pending communication queue and store an indication of the credit limit;
  receive, by the host fabric interface and from the compute device, one or more parameters of a message to be sent by the host fabric interface, wherein the one or more parameters of the message comprises a number of credits required to send the message and wherein the host fabric interface is different from a processor of the compute device;
  add an entry to the pending communication queue in response to receipt of the one or more parameters of the message;
  determine, by the host fabric interface, a number of currently available credits of the credit management system;
  determine, by the host fabric interface, whether the number of currently available credits is at least the number of credits required to send the message; and
  send, by the host fabric interface and in response to a determination that the number of currently available credits is at least the number of credits required to send the message, the message to the remote compute device.

16. The one or more non-transitory computer-readable media of claim 15, wherein to initialize the credit management system comprises to:
  initialize a value of an available credit counter to the credit limit, wherein the value of the available credit counter indicates a cumulative number of credits available; and
  initialize a value of a queue credit counter to zero, wherein the value of the queue credit counter indicates a cumulative number of credits used by the pending communication queue.

17. The one or more non-transitory computer-readable media of claim 16, wherein to add the entry to the pending communication queue comprises to:
  determine a trigger value based on the number of credits required to send the message and a present value of the queue credit counter;
  add a trigger to send the message when the value of the available credit counter is at least the trigger value; and increase the value of the queue credit counter by the number of credits required to send the message.

18. The one or more non-transitory computer-readable media of claim 17, wherein to determine whether the number of currently available credits is at least the number of credits required to send the message comprises to determine whether the value of the available credit counter is at least the trigger value.

19. The one or more non-transitory computer-readable media of claim 18, wherein the plurality of instructions further causes the compute device to:
receive, by the host fabric interface, an acknowledgement of receipt of the message by the remote compute device; and
increase, by the host fabric interface, the value of the available credit counter by the number of credits required to send the message.

20. The one or more non-transitory computer-readable media of claim 15, wherein to store an indication of the credit limit comprises to initialize a value of an available credit counter to the credit limit,
wherein to determine, by the host fabric interface, a number of currently available credits of the credit management system comprises to determine, by the host fabric interface, a current value of the available credit counter, and
wherein to determine, by the host fabric interface, whether the number of currently available credits is at least the number of credits required to send the message comprises to determine, by the host fabric interface, whether the value of the available credit counter is at least the number of credits required to send the message.

21. The one or more non-transitory computer-readable media of claim 15, wherein to determine whether the number of currently available credits is at least the number of credits required to send the message comprises to determine whether the number of currently available credits is at least the number of credits required to send the message when the entry of the pending communication queue associated with the message is at a head of the pending communication queue.

22. A compute device for offloaded management of communication by a host fabric interface of the compute device, the compute device comprising:
means for determining a credit limit for a credit management system based on a storage write bandwidth of a remote compute device;
means for initializing the credit management system on the host fabric interface, wherein the means for initializing the credit management system comprises means for initializing a pending communication queue and means for storing an indication of the credit limit;
means for receiving, by the host fabric interface and from the compute device, one or more parameters of a message to be sent by the host fabric interface, wherein the one or more parameters of the message comprises a number of credits required to send the message and wherein the host fabric interface is different from a processor of the compute device;
means for adding an entry to the pending communication queue in response to receipt of the one or more parameters of the message;
means for determining, by the host fabric interface, a number of currently available credits of the credit management system; and
means for determining, by the host fabric interface, whether the number of currently available credits is at least the number of credits required to send the message,
wherein the host fabric interface is to send, in response to a determination that the number of currently available credits is at least the number of credits required to send the message, the message to the remote compute device.

23. The compute device of claim 22, wherein the means for initializing the credit management system comprises:
means for initializing a value of an available credit counter to the credit limit, wherein the value of the available credit counter indicates a cumulative number of credits available; and
means for initializing a value of a queue credit counter to zero, wherein the value of the queue credit counter indicates a cumulative number of credits used by the pending communication queue.

24. The compute device of claim 23, wherein the means for adding the entry to the pending communication queue comprises:
means for determining a trigger value based on the number of credits required to send the message and a present value of the queue credit counter;
means for adding a trigger to send the message when the value of the available credit counter is at least the trigger value; and
means for increasing the value of the queue credit counter by the number of credits required to send the message.

25. The compute device of claim 1, wherein the plurality of instructions further causes the compute device to:
determine a second credit limit for a second credit management system based on a message ordering requirement for communication to a second remote compute device;
initialize the second credit management system on the host fabric interface, wherein to initialize the credit management system comprises to initialize a second pending communication queue and store an indication of the second credit limit;
receive, by the host fabric interface and from the compute device, a first message and a second message, wherein the first message is to be sent before the second message;
send the first message to the second remote compute device, wherein to send the first message comprises to reduce a second available credits counter;
receive an acknowledgement for the first message from the second remote compute device;
increase the second available credit counter in response to receipt of the acknowledgement for the first message; and
send, in response to the increase to the second available credit counter, the second message to the second remote compute device.

* * * * *